Feb. 1, 1938.    D. C. WRIGHT ET AL    2,106,965
SCREW DOWN MOTOR CONTROLLER
Filed Dec. 21, 1933    3 Sheets-Sheet 3

INVENTOR.
DAVID C. WRIGHT.
BY HARRY L. WILCOX.
*John H Leonard*
ATTORNEY.

Patented Feb. 1, 1938

2,106,965

UNITED STATES PATENT OFFICE 2,106,965

SCREW DOWN MOTOR CONTROLLER

David C. Wright and Harry L. Wilcox, Cleveland, Ohio, assignors to the Electric Controller & Manufacturing Company, Cleveland, Ohio, a corporation of Ohio Application December 21, 1933, Serial No. 703,424

36 Claims. (Cl. 172—239)

This invention relates to a means for and method of automatically controlling the operation of a screw down motor in connection with the operation of rolling mills.

In the operation of rolling mills it is necessary to vary the spacing of the rolls in working a bloom or ingot down to a desired shape and size. In so doing the bloom or ingot is passed between the rolls at least once for each spacing. Between each of these passes the separation of the rolls is varied. This is at present done by the operation of what is known as a screw down motor, usually controlled with a hand or semi-automatically operated controller. This invention has for its main purpose the provision of means for fully controlling the spacing of the rolls automatically.

It is therefore a general object of this invention to provide means for presetting a predetermined schedule of roll spacings and for thereafter effecting the spacings automatically in response to an initiating means.

Another object is to provide a control mechanism which, after the rolls are caused to assume a definite spacing, automatically resets or conditions itself for a subsequent spacing of rolls.

Another object is to provide complete control of the mechanism by conveniently arranged push buttons, so that a given sequence or schedule of roll spacings may be carried out, or any one or more of the settings in the schedule omitted or repeated, by the simple manipulation of these push buttons.

Another object is to provide, in connection with the automatic control apparatus, manually operated means so adapted that the control of the screw down motor may at any stage and at any time be taken away from the automatic control means and entirely and wholly controlled by the manual means.

Another object is to provide a control mechanism of this character in which the rolls may be accurately spaced according to a predetermined schedule of spacings, with provision for automatically "plugging" or "inching" the screw down motor should it drift beyond the point corresponding to the desired roll setting, thereby making possible automatic setting of the rolls within narrow predetermined limits.

A still further object is to provide a control mechanism of this character in which a plurality of independent schedules of roll spacings may be provided for, and means in connection therewith whereby it is possible to switch from one of these schedules to any other, or back and forth from one schedule to the other, at any time, by the operation of conveniently arranged push buttons, and without requiring an excessive interval of time or unreasonable effort on the part of an operator.

Yet a further object is to provide an automatic control mechanism of this character which will carry through a schedule of roll settings independently of the skill of an operator, thereby making possible the automatic treatment of a bloom or ingot according to a predetermined scientifically worked out schedule of passes.

Yet further and more specific objects will be apparent from the ensuing description, in which Fig. 1 is a schematic layout of a portion of the apparatus in one embodiment of our invention, showing its relation to a screw-down motor.

Figure 1:
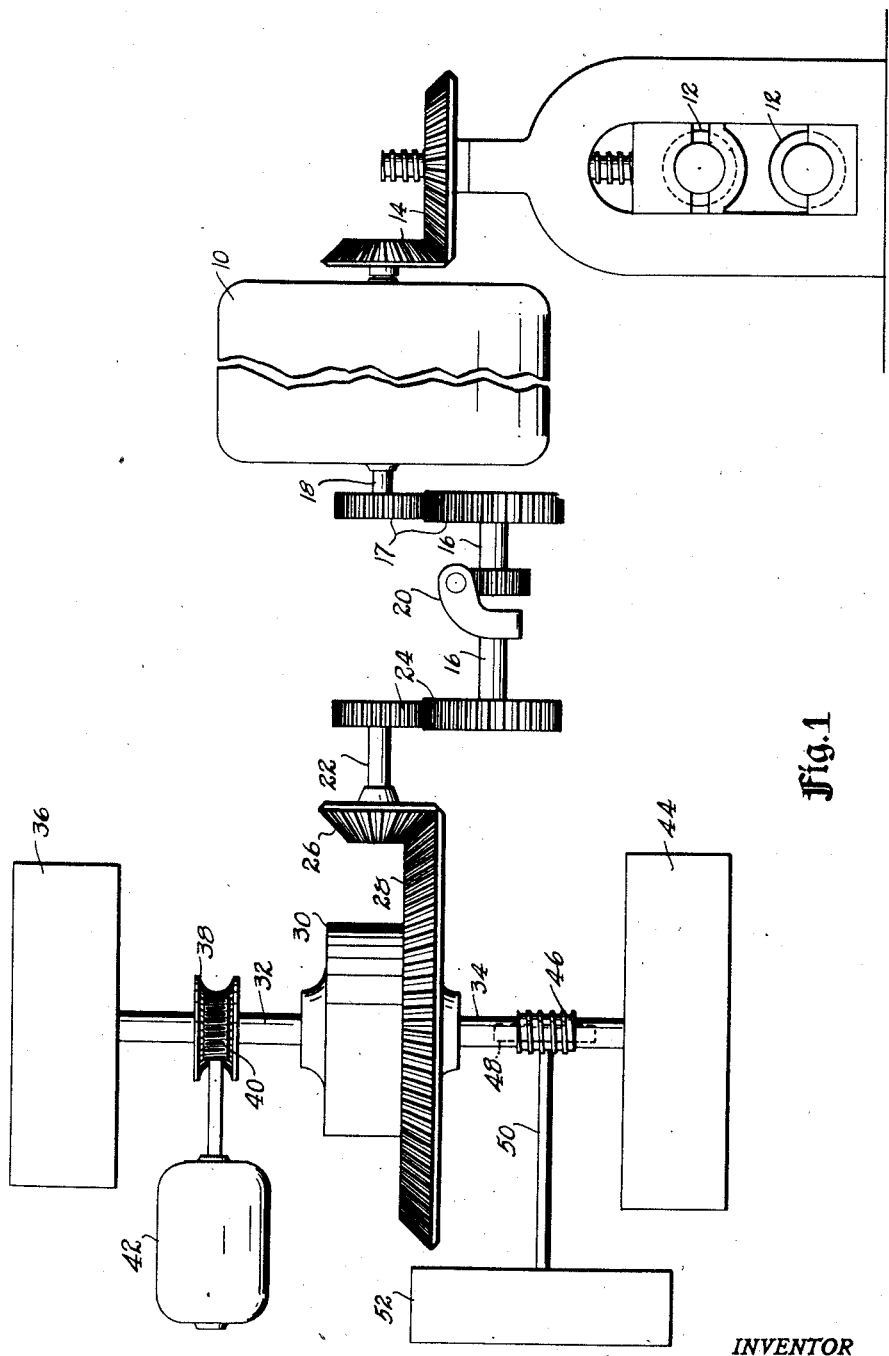

Referring now to Fig. 1, there is shown a screw-down motor 10 suitably geared to relatively movable rolls 12 through gearing 14, the gearing being adapted to separate the rolls 12 by rotation of the screw-down motor 10. Also is shown a driven shaft 16 geared to the screw-down motor shaft 18, as by gears 17. The driven shaft 16 is shown as interrupted by an adjustable coupling 20, hereinafter more fully referred to. A pinion shaft 22 is suitably connected to the driven shaft 16 by gears 24, as shown. The pinion shaft 22 has integral therewith a pinion 26 meshing with a ring gear 28, which is associated with a differential 30 similar to that used in an automobile. Operably connected with the differential 30 are shafts 32 and 34. Rigidly secured to one end of the shaft 32 is an operating arm 84 (see Fig. 2) of a vernier rheostat 36. Rigid with the shaft 32, intermediate the differential 30 and the vernier rheostat 36, is a worm gear 38 meshing with a worm 40 on the shaft of a set-up motor 42.

Fixedly secured to the shaft 34 is an operating arm 102 (see Fig. 2) of a cut-out or directional control device 44, the details of which will more clearly hereinafter appear. Rigid with the shaft 34, intermediate the differential 30 and the cut-out device 44, is a worm 46 meshing with a worm gear 48 rigid with a shaft 50 secured to the operating arm 62 (see Fig. 2) of a main rheostat 52.

The gears 38 and 40 may be selected to give any ratio therebetween, but it is preferable to use gears producing a high ratio, as for example, 35 to 1, to increase the accuracy of control, as will more clearly hereinafter appear. The gears 46 and 48 must however be selected with regard to the design of the main rheostat 52 and the cut-out device 44 corresponding to the number of contacts used. For the purpose of this disclosure a ratio of 10 to 1 will be assumed, that is, when the shaft 34 makes one revolution the shaft 50 will have made $\frac{1}{10}$ revolution. It will thus be seen that when shafts 32 and 34 are operating at the same speed the operating arms on the vernier rheostat 36 and the directional control device 44 will be traveling at the same rate of speed, and when these two arms are making one revolution the arm on the main rheostat 52 will be making $\frac{1}{10}$ of a revolution. If the number of contacts on the main rheostat are made exactly 10, the arm 62 on the main rheostat will travel a distance equal to that from the center line of one contact to the center line of the adjacent contact while the arm 102 of the directional control or cut-out device 44 and the arm 84 on the vernier rheostat 36 each make one revolution.

It will also be noted that when the pinion 26 is driving the ring gear 28 that only the shaft 34 is rotated, since the shaft 32 is locked by the action of the worm 40 and the worm gear 38. On the other hand, when the set-up motor 42 is driving the shaft 32 and the pinion 26 is at rest, it will, by action of the differential 30, also drive the shaft 34 at the same speed but in the reverse direction. The reasons for these observations will appear presently.

Figure 2:
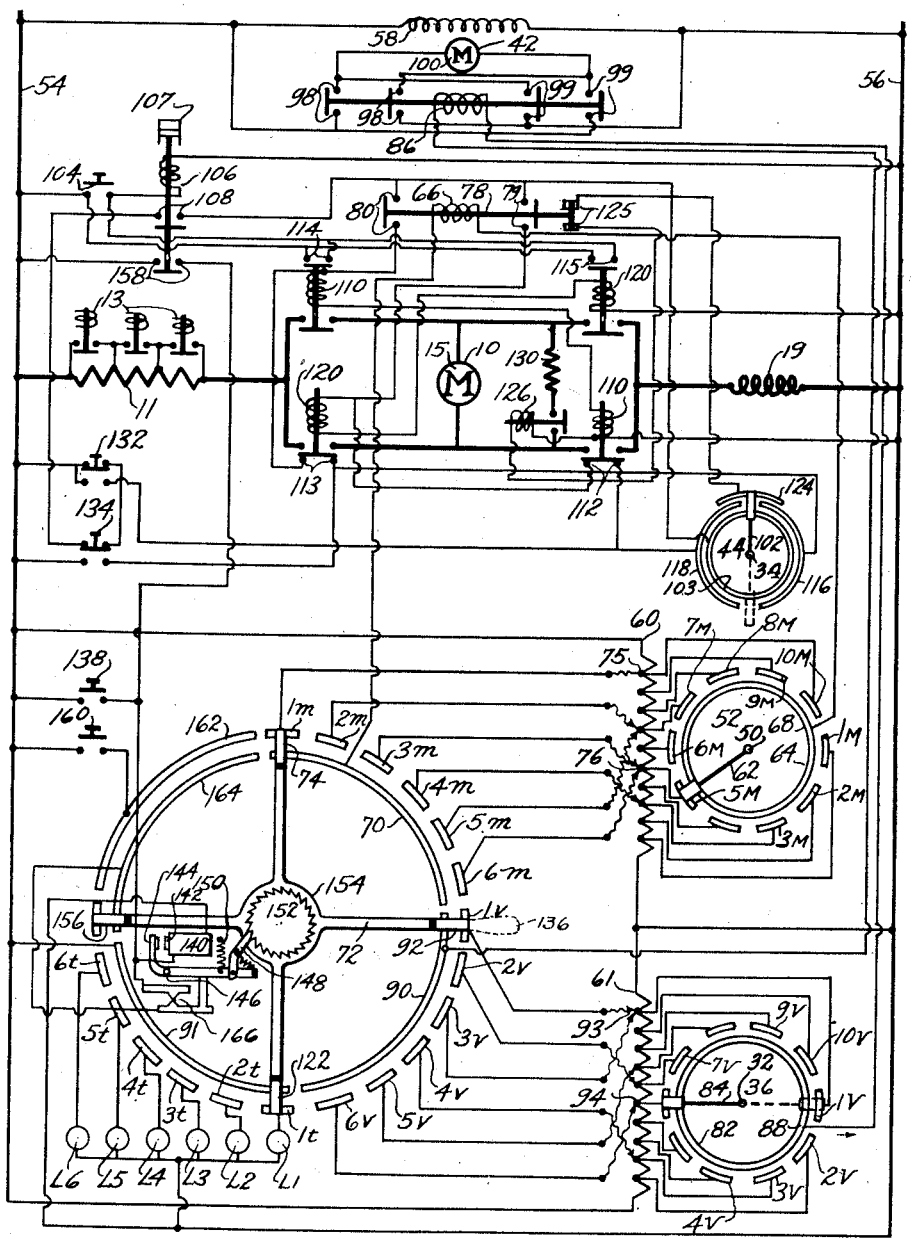
Fig. 2 is a simplified diagram of connections embodying this and other apparatus for controlling the screw-down motor.

Referring now to Fig. 2, there is shown a pair of supply lines 54 and 56 to which is directly connected a shunt field 58 of the set-up motor 42, and a main resistance 60 and a vernier resistance 61. The main resistance 60 may have ten equally spaced taps connected to ten corresponding segments respectively identified as 1M through 10M on the main rheostat 52. Other numbers of taps and segments may of course be used but the number should preferably correspond to the ratio between gears 46 and 48. The rotatable arm 62 of the main rheostat 52 bridges a ring 64 and the segments 1M through 10M uniformly spaced therearound, as shown. A polarized relay 66 has one of its terminals connected to the ring 64 at 68 and the other of its terminals connected to a segmental ring 70 of a selector device 72, as indicated. The selector device has contacts 1m through 6m uniformly spaced with respect to the segmental ring 70, and bridging the contacts 1m through 6m and the segmental ring 70 is a contacting rotatable arm 74. Assuming the arm 74 to bridge the segmental ring 70 and contact 1m, and the latter connected to a point on the main resistance 60 as indicated at 75, it will be apparent that with current flowing through the main resistance 60, the polarized relay 66 will measure a voltage drop across a segmental portion of this resistance between the points 75 and 76. The feature of the polarized relay 66 of importance is that it will attract its armature member 78 to the right or left, depending upon the direction of current flow therein.

The vernier resistance 61 may also have ten equally spaced taps connected to ten corresponding segments numbered respectively 1V through 10V on the vernier rheostat 36. This rheostat may have a ring member 82 and the rotatable arm 84 of the vernier rheostat 36 spans the ring 82 and the uniformly spaced segments disposed therearound. A second polarized relay 86 may have one of its terminals connected to the ring 82 of the vernier rheostat 36 as indicated at 88, and the other of its terminals connected to a second segmental ring 90 on the selector device 72. Uniformly disposed adjacent to the segmental ring 90 are contacts numbered 1v to 6v. When a contacting arm 92 bridges the segmental ring 90 and the contact 1v it will be seen that the polarized relay 86 is measuring a voltage drop between points 93 and 94 on the vernier resistance 61.

The polarized relay 66 is adapted to close contacts 79 or contacts 80 to control the energization of directional contactors 120 and 110 respectively for energizing the screw down motor 10 for either forward or reverse rotation, that is for an up or down movement of the rolls. As shown, the screw down motor 10 has an armature 15 connected to the contactors 110 and 120. A series field 19 is suitably connected between the armature and the supply line 56. The armature may be connected to the supply line 54 through an accelerating or starting resistance 11, which resistance may be cut out upon acceleration of the screw down motor by operation of the relays 13, the connections of which need not be shown, as this feature is old in the art.

A relay 106 may have one terminal connected to the contacts of a push button 104 which in turn is connected to the supply line 54, and the other terminal of the relay 106 may be connected directly to the supply line 56. The relay 106 may be adapted to close normally-open contacts 108 to supply current to the screw down contactors 110 or 120 through contacts 80 and 79 respectively, and also to close normally-open contacts 158 for a purpose which will hereinafter appear.

The upper contactors 110 and 120 may have normally-open contacts 114 and 115 in parallel with the push button 104, so that upon the energization of either contactor by pressing on the push button 104 and consequent closing of contacts 108, (as will more clearly be described later) the contactor operated is held closed by closing of these contacts. Lower contactors 110 and 120 may have normally closed back contacts 112 and 113 connected to segmental rings 118 and 116, respectively, on the cut-out device 44. The rotatable contacting arm 102 of the cut-out device 44 engages an inner ring 103 and the two segmental rings 116 and 118, as well as a segmental ring 124, the purpose of which will be described later.

The polarized relay 86 may have normally open contacts 98 and 99 for controlling directional rotation of the set up motor 42 which is provided with an armature 100.

The armature member 78 of the relay 66 and the armature of the relay 86 are each biased by suitable means, as by springs (not shown) to maintain them normally in an inoperative or intermediate position and to return them to this position of de-energization of the relay windings.

The selector device 72 may have in addition to the contacts already described a plurality of contacts numbered 1t to 6t, to which may be connected indicator lamps L1 to L6, respectively, each of which is lighted by means of a rotatable arm 122 adapted to engage each of the contacts 1t through 6t and a segmental ring 91.

The other portions of this figure not heretofore specifically referred to will be more understandable from a discussion of the operation of the device, as will now be given.

Let us assume for the purpose of explaining the operation of the control apparatus that the gearing heretofore described is such that the rotation of the main rheostat arm 62 from the center of one contact to the center of the next contact corresponds to 1" travel of the roll; that the rolls are together (zero separation) when the arm 62 is at the center of contact 1M, it being remembered that the screw-down motor stops when the arm 62 is at the center of any of the selected contacts 1M through 10M. Assume also that the movement of the vernier rheostat arm 84 from the center of one contact to the center of the next contact moves the main rheostat arm 62 one-tenth of a distance between the center lines of adjacent contacts, this corresponding to $\frac{1}{10}$" roll travel. The duty of the set-up motor 42 controlled by the vernier rheostat 36 is to move the main rheostat arm 62 backward or forward a selected number of degrees away from the center line of the contact on which the main rheostat arm 62 last stopped so that the degrees of travel of the main rheostat arm 62 to the center line of the contact on which it has to stop on the next operation, will correspond with the inches and fractions of an inch which the roll must travel to give roll separation for the next pass. It will be noted that in the example assumed it is possible to pre-select the stopping of the screw-down motor with the rolls at one hundred different points $\frac{1}{10}$" apart from zero inches to 10" roll separation.

Assume also that the connections from contact 1m to 6m and the connections 1v to 6v are plugged in to points on the resistances 60 and 61, respectively, as shown in Fig. 2. The following schedule of roll separation will result by automatic operation:

| Pass | Roll separation | Roll travel |
| --- | --- | --- |
| 1 | 9.0" | 4.5" up (from pass #6) |
| 2 | 6.4" | 2.6" down |
| 3 | 4.0" | 2.4" down |
| 4 | 2.8" | 1.2" down |
| 5 | 6.3" | 3.5" up |
| 6 | 4.5" | 1.8" down |

Assume further that the apparatus is as shown in Fig. 2, with the rheostat arms 62 and 84 and the cut-out arm 102 in the positions shown in solid lines, this representing the condition of the apparatus just after the screw-down motor had stopped at the last pass number 6 with the selector arms in the last previous positions, in which contact 122 connected segmental ring 90 to contact 6v; contact 92 connected segmental ring 70 to contact 6m; contact 156 connected segmental ring 91 to contact 6t; contact 74 connected segmental ring 164 to segmental ring 162. This indicates that the rolls have been stopped 4.5" apart, as indicated in Fig. 1.

Assume also that the arms of the selector device 72 have been moved to the position shown in Fig. 2, which represents the position for pre-selecting the separation of the rolls for the first pass. Now, if power is supplied to the wires 54 and 56, shunt field 58 of the set-up motor 42 will be energized; current will flow through the resistors 60 and 61; polarized relay 66 will be energized across a portion of the resistor 60 between points 75 and 76, closing contacts 79, but no current flows as yet; polarized relay 86 will be energized between points 93 and 94 on the resistor 61, closing contacts 98; and current will be supplied to indicating lamp L1 through contact 1t to indicate that the apparatus is set up for pass #1.

The closure of contacts 98 by the polarized relay 86 will energize the armature of the set-up motor 42, which then operates to move the vernier rheostat arm 84 clockwise to contact 1V, at which time the polarized relay 86 is deenergized and the set-up motor circuit is opened. This stops the set-up motor with vernier rheostat arm 84 and the cut-out arm 102 in the positions shown in dotted lines. The main rheostat arm 62 has at the same time been moved by the set-up motor 42 in a clockwise direction over a portion of the contact 5M, corresponding to .5" roll travel. The apparatus is now pre-set for the operation of the screw-down motor and the operator can separate the rolls for the first pass. This he does by pressing the push button 104, whereupon the relay 106 closes contacts 108 and 158. Since the contacts 79 of polarized relay 66 are already closed, the "up" contactors 120 will be energized through contacts 108. Contactors 120 close the "up" circuit of the screw-down motor 10 and also the contact 115 for shunting the contacts of push button 104, for maintaining the relay 106 energized after the push button 104 is released. Closure of contacts 158 energize the winding 140 of the notching device on the selector; this pulls down the latch 148 to engage the next tooth of notching wheel 152, but no movement of 152 and 154 results as long as contacts 158 are closed. The closing of the main circuit of the screw-down motor 10 causes it to operate to separate the rolls and at the same time rotate the arm 62 of the main rheostat in a clockwise direction, with the cut-out arm 102 also rotating in a clockwise direction, making one complete revolution while the arm 62 moves from the center of one contact to the center of the next.

When the arm 62 first engages the contact 10M, polarized relay 66 is deenergized, the arm cut-out 102 at this moment being in the position shown in dotted lines. The deenergization of polarized relay 66 opens contacts 79 but the "up" contactors 120 are maintained closed through the segmental ring 118 on the cut-out 44 until the cut-out arm 102 has advanced to engage the segmental ring 124, which energizes a slow-down contactor 126, shunting the motor armature 15 with a resistance 130. It will be noted that the circuit to contact segment 124 of the cut-out device 44 passes through a sliding contact switch 125, closed only in the intermediate position of the armature 78 of the relay 66. This insures that the slow-down contactor 126 will not close the armature shunt circuit except when the relay 66 is deenergized to slow down and stop the motor 10.

When the cut-out arm 102 leaves the segmental ring 118, the "up" contactors 120 are deenergized and the motor circuit opened to stop the screw-down motor with arm 62 at the center of contact 10M. It is seen that arm 62 has moved over a space of four and a half contacts corresponding to 4.5 inches roll travel. The rolls are now 9" apart. When contactors 120 open, contacts 115 open, deenergizing the coil of relay 106; contacts 108 and 158 do not open immediately because of the retarding action of the dash-pot 107. Should the screw-down motor 10 not stop accurately and the cut-out arm 102 over-travel to engage segmental ring 116, the "down" contactors 110 will close to "plug" the screw-down motor and lower the rolls until the arm 102 leaves ring 116 and the "down" contactors open, to stop the screw-down motor accurately with the arm 102 in the position shown in solid lines. After a few seconds, relay 106 opens contacts 108 and 158. The opening of contacts 158 deenergizes the relay winding 140, whereby the spring 150 advances the hub 154 of the selector so that contact 74 connects segmental ring 70 to 2m; contact 122 connects segmental ring 91 to contact 2t; contact 92 connects segmental ring 90 to contact 2v; contact 156 connects segmental ring 164 to segmental ring 162. This operation immediately energizes the polarized relay 66 to close contacts 80; polarized relay 86 to close contacts 99 for rotating the vernier rheostat arm 84; and lamp L2 is now lighted through the contact 2t. The set-up motor then moves the vernier rheostat arm 84 counter-clockwise to contact 7V, and the main rheostat arm 62 counter-clockwise .4 of contact 10M, at which time the relay 86 is deenergized, stopping the set-up motor. The apparatus is now ready for operating the screw-down motor for the second pass. Upon pressing the push button 104, the motor 10 will lower until the main rheostat arm 62 stops at center of contact 7M, corresponding to 2.6" roll travel, leaving the rolls separated 6.4".

As the operation continues, the set-up motor automatically moves the vernier rheostat arm 84 and cut-out arm 102, and the relay 106 opens its contacts at the end of each operation of the screw-down motor. The screw-down motor is stopped at the pre-selected distances as determined by the connections between the points on the resistances 60 and 61 to the terminals connected to the contact segments 1m to 6m and 1v to 6v, respectively, for each successive pass. The only operation required by the operator is the pressing of the push button 104 whenever he desires to operate the screw-down motor to secure the roll separation for the next pass.

At any time during the automatic operation of the apparatus, the operator can control the screw-down motor manually to separate the rolls any distance desired to take care of unusual conditions which may exist during the operating cycle. If the butt end of the ingot is split and would form too much resistance for the standard roll setting, the operator can increase the separation of the rolls by pressing the "up" push button 132, which directly controls the "up" contactors 120; or, if a cobble should form the operator can raise and lower the rolls at will by operating the push buttons 132 and 134, respectively, the latter controlling the "down" contactors 110. After the operator is through with manual operation and has released these push buttons, the control goes back automatically to control by the selector switch 72 corresponding to its position. The operator can determine from the lights for which pass the selector has set up the controller. While the selector device 72 may be manually operated, as by a handle shown in dotted lines at 136, it may be also operated by means of the push button 138. When the push button 138 is pressed downwardly the electromagnet 140 is energized, attracting toward its core 142 an armature 144 pivoted at 146, which in turn withdraws the ratchet arm 148 against the pressure of the spring 150, and upon release of the push button 138 the ratchet arm 148 reacts against teeth in the ratchet wheel 152 to rotate the hub 154, and the contacting arms 74, 92, 122 and 156.

If the operator wishes to return the selector arms to their normal first pass position, as shown in Fig. 2, the push button 160 may be closed, which by means of the automatic operation of the magnet 140 through its control circuit contacts 166 and the segmental rings 164 and 162, returns the selector arms until the contact 156 bridging segmental rings 164 and 162 passes off the segmental ring 162 and thereby stops the operation with the selector arms in the position shown in Fig. 2.

In Fig. 1 there is shown a coupling 20 interconnecting the two portions of shaft 16. The purpose of this coupling is to permit adjustments between the positions of arms on the main and vernier rheostats, and on the cut-out device, and the position of the rolls, for either variations due to wear of the rolls or for such other reasons as necessitate this. This feature is of importance in that such changes may be necessary from time to time to make the arm positions correspond exactly to the roll spacing.

Figure 3:
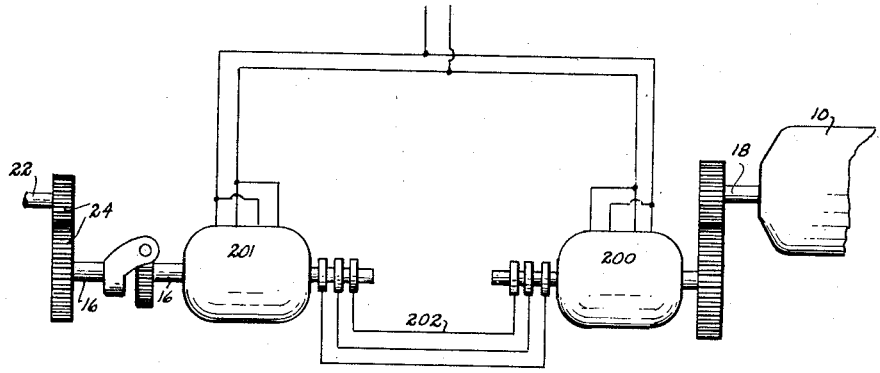
Fig. 3 is a fragmentary view of a portion of the apparatus employed in one embodiment of our invention and showing a different method of driving the control apparatus in accordance with operation of the screw down motor.

Also, while we have indicated a mechanical coupling between the screw-down motor and the differential drive, it will be apparent that we may use an electro-magnetic or inductive coupling, such as a synchronous tie composed of a synchronous motor connected to the screw-down motor and a synchronous motor connected to the differential device, which may be remotely located from the screw-down motor, and by connections well known in the art, couple the screw down motor with the differential drive thereby. This modification is illustrated in Fig. 3 in which there are a pair of motors 200 and 201, the motor 200 having a gear 17 secured on its armature shaft so that the armature is rotated when the screw-down motor shaft 18 revolves. The motor 201 has an armature shaft 16 on which the adjustable coupling 20 is mounted so that the shaft 16 is revolved when the armature of this motor revolves. The shaft 16 drives the pinion shaft 22 through the gears 24, the construction being similar to that illustrated in Fig. 1. The motors 200 and 201 each consists of an alternating current field which is excited from a common source of current. Within the field of each of these motors is located a three phase alternating current armature, the armatures of the two motors being connected by means of the three phase wires indicated at 202. The result is that when the armature of the motor 200 is rotated, the armature of the motor 201 will follow into the same rotative position, thereby driving the control apparatus in accordance with rotation of the screw-down motor. Transmitting devices of this character are well known in the art, so that a detailed illustration and description of the devices are omitted in this application.

While we have shown one arrangement of screw-down motor differential device, main rheostat, vernier rheostat, cut-out and set-up motor, it will be apparent that a number of arrangements of these devices may be made from the teachings of this application to accomplish substantially the same end, and we do not desire to be limited to the specific arrangement shown. The principle involved in the invention is the rotation of contacting elements on the main rheostat and the cut-out device by the screw-down motor to control the latter motor, and independent rotation of these contacting elements on the main rheostat and the cut-out device, in addition to that on the vernier rheostat, to effect a pre-setting of the contacting elements on the main rheostat and cut-out device to control rotation of the screw-down motor.

It will also be noted that knife switches may be inserted in the connections between the resistance 60 and the contacts 1m to 6m and in the connection between the resistance 61 and the contacts 1v to 6v, whereby several sets of connections could be set up and changed over at will by the operator to secure a number of different schedules of automatic operation to accommodate the rolling of different sizes of ingots or bars as they come to the mill to be rolled.

Figure 4:
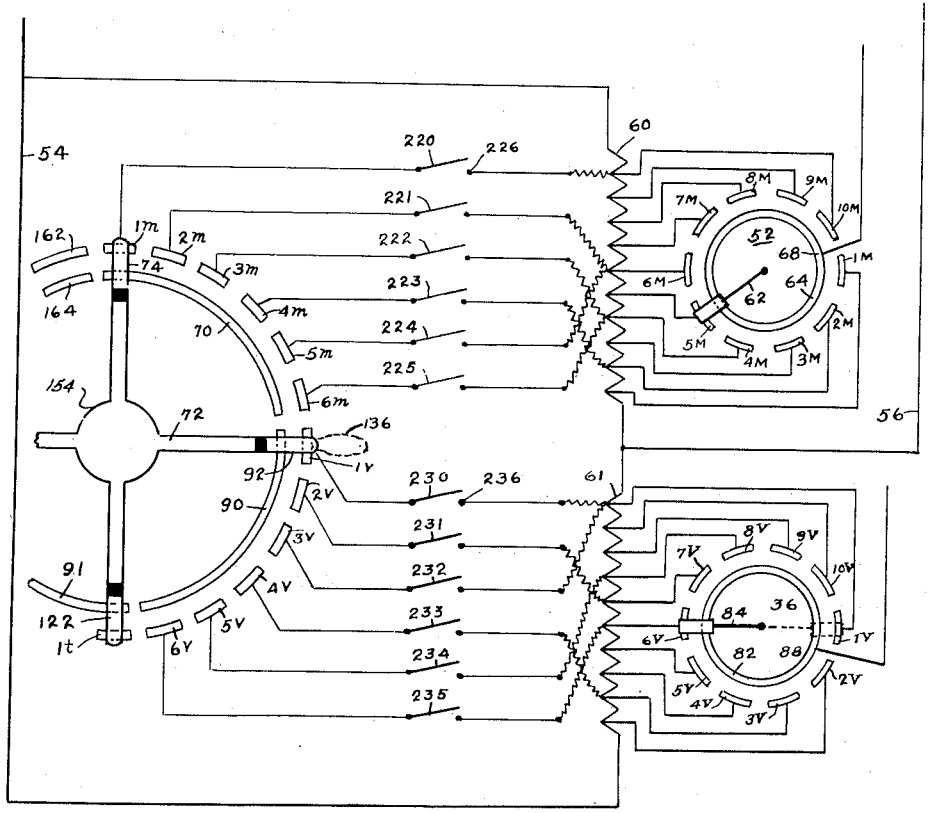
Fig. 4 is a fragmentary diagram of connections which we may employ in another embodiment of our invention.

This is best understood by reference to Fig. 4 of the drawings, which is a fragmentary view showing a modified form of connection between the selector device 72 and the resistance 60 of the main rheostat and the selector device 72 and the resistance 61 of the vernier rheostat. As shown in this figure, the conductors leading from the contacts 1m to 6m are connected to switch arms 220 to 225 respectively, each of which switch arms is movable so as to engage an associated cooperating contact, such as the contact indicated at 226. Each contact 226 is connectible to any selected points on the resistance of the main rheostat. Likewise, the conductors leading from the contacts 1v to 6v are connected to switch arms 330 to 335 respectively, each of which is movable so as to engage an associated cooperating contact, such as indicated at 236. Each contact 236 is connectible to any selected point on the resistance of the vernier rheostat.

A plurality of independent schedules of roll spacings thus may be set up concurrently, closure of one group of knife switches rendering one schedule operative, and closure of another group rendering a different schedule operative.

It is to be understood that the selector device 72 has been shown with only a few contacts in order to permit simplicity and clarity of description. Obviously, it might have any number of contacts in each quadrant, thereby permitting great flexibility in schedule selection.

Let us assume, for the purpose of explaining the operation of the modification of Fig. 4, that the operator wishes to operate on a selected one of a plurality of schedules which have been pre-set and which selected schedule will be brought into operative relation by closure of switches 223 to 225 and 233 to 235. With the arms 74 and 92 in the positions shown in Fig. 4, the push button 138 may be operated to rotate the arms 74 and 92, in a manner previously described, until they engage contacts 4m and 4v respectively, or the arms may be moved by means of handle 136. Since knife switches 230 to 232 are open, no operation will result until arm 92 engages contact 4v. A circuit is then completed through closed switch 233 to rotate the main and vernier rheostat arms to the first pre-set position of the schedule selected by closure of switches 223 to 225 and 233 to 235. Operation of push button 104 (see Fig. 2), will then start the screw-down motor and drive the rolls to the proper spacing for the first pass of the selected schedule. Upon the deenergization of the screw-down motor, the selector device 72 will automatically rotate one notch so as to make a circuit from ring 90 to contact 5v, through closed switch 234 to a point on resistance 61 and from ring 70 to contact 5m, through closed switch 224 to a point on resistance 60, thus permitting repeating the operation for the second pre-set point of the selected schedule.

Thus the operator, in changing from one schedule to another, is not required to pick out very carefully the proper sockets of the rather involved array of possible socket connections and then carefully build up the desired schedule. On the contrary, he need only throw a certain number of simple knife switches, each in a like manner, and the preselected degrees of screw-down in the schedule are thereby provided. Nor does he have to remove the plugs from the socket determining one schedule in order to set up another schedule. As a result, a highly skilled party can set up and preselect the schedules in a manner such that an unskilled operator can readily place the preselected schedules in effect.

We claim:

1. In a motor controller, the combination of a motor and means actuated in accordance with rotation of the motor and operable to effect stopping of the motor in a plurality of predetermined positions, said means comprising, means for controlling the motor for relatively large rotational movements, means for controlling the motor for relatively small rotational movements, means determinable by the deenergization of said motor for presetting said controlling means governing subsequent motor movements, and means rendering said first mentioned controlling means inactive when said last mentioned controlling means is active in controlling the motor.

2. The combination of two electrical motors, a control device for stopping one of the motors, a second control device for stopping the other motor, and means connecting the control devices to the motors whereby the first mentioned motor drives its control device and the second motor drives both control devices.

3. The combination of a main motor, a control device for stopping the motor, a second motor, a second control device for stopping the second motor, a differential gear mechanism connected to both motors and to both control devices, means whereby the main motor drives the first mentioned control device through the said gear mechanism when the second motor is not running, and means whereby the second motor drives both control devices through said gear mechanism when said main motor is not running.

4. In a motor control system, the combination of a pair of rheostats, each having movable contacting elements, a differential device interconnecting said elements, a main motor drivingly connected with said differential device, and an auxiliary motor drivingly connected with one of said elements, each of said rheostats controlling the application of current to one of said motors.

5. The combination of a main motor, a pair of rheostats each having movable contacting elements, a differential device interconnecting said elements, said device being operatively associated with said main motor, and an auxiliary motor operatively associated with one of said elements, and a relay coacting with one of said rheostats to control the rotational movement of one of said motors, the other of said rheostats being adapted to control rotational movement of the other of said motors.

6. The combination of a motor, contactors for energizing said motor, a rheostat device having a movable contacting member operatively associated with the motor, a polarized relay responsive to movement of said member for controlling said contactors, and a directional control device adapted to become active in controlling the motor when said polarized relay is inactive.

7. The combination of a motor, a rheostat having a plurality of contacts, a relatively movable contacting arm coacting with said contacts, said arm being operatively connected with said motor, a polarized relay responsive to a movement of said arm for controlling a circuit to said motor, a relay responsive to current in said circuit, a selector device for unbalancing said polarized relay, and means responsive to a movement of said relay for actuating said selector device.

8. The combination of a motor, means for reversing said motor, a control device having a movable member adapted to be driven by the motor for initiating the stopping of the motor at a plurality of points in the travel of said device, means for selecting one or more of said points for initiating the stopping of the motor, and means for moving said device independently of the movement of the motor to position the movable member a selected distance from one of the selected points.

9. In an electrical motor system, the combination of two motors, a control device for stopping one motor, a second control device for stopping the other motor, and means for connecting the two motors to the control devices, the means being arranged so that one of the motors drives one of the control devices and so that the other of said motors drives both of the control devices, the first-named control device being driven independently of rotation of the first motor when it is driven by the second motor.

10. In combination, a motor, means for energizing the motor, and means actuated by the motor and controlling the period during which the motor is operated to effect the stopping of the motor at a plurality of predetermined points, said means comprising a plurality of spaced contacts, a contactor engageable with said spaced contacts, the contacts and the contactor being relatively movable responsive to rotation of the motor, circuits including the contacts and the contactor and operable to control the application of current to the motor, means to optionally select circuits through different ones of said contacts whereby the amount of rotation of the motor is selectively controlled in units equal to that required to effect movement of the contacts and the contactor relative to each other the distance between one contact and an adjacent contact, and means for effecting movement of the contacts and the contactor relative to each other and independently of rotation of the motor to control the amount of rotation of the motor for amounts less than the units determined by the circuits through the contacts.

11. In combination, a motor, means for energizing the motor, and means actuated by the motor and controlling the period during which the motor is operated to effect the stopping of the motor at a plurality of predetermined points, said means comprising a plurality of spaced contacts, a contactor engageable with said spaced contacts, the contacts and the contactor being relatively movable responsive to rotation of the motor, circuits including the contacts and the contactor and operable to control the application of current to the motor, means to optionally select circuits through different ones of said contacts whereby the amount rotation of the motor is selectively controlled in units equal to that required to effect movement of the contacts and the contactor relative to each other the distance between one contact and an adjacent contact, means for effecting movement of the contacts and the contactor relative to each other and independently of rotation of the motor to control the amount of rotation of the motor for amounts less than the units determined by the circuits through the contacts, and means responsive to the rotation of the motor and controlling the application of current to the motor and operable to effect stoppage of the motor with the contactor in a predetermined relation to the contact in the circuit selected to control the application of current to the motor.

12. In combination, a motor, means for energizing the motor, and means actuated by the motor and controlling the period during which the motor is operated to effect the stopping of the motor at a plurality of predetermined points, said means comprising a plurality of spaced contacts, a contactor engageable with said spaced contacts, the contacts and the contactor being relatively movable responsive to rotation of the motor, circuits including the contacts and the contactor and operable to control the application of current to the motor, means to optionally select circuits through different ones of said contacts whereby the amount of rotation of the motor is selectively controlled in units equal to that required to effect movement of the contacts and the contactor relative to each other the distance between one contact and an adjacent contact, means for effecting movement of the contacts and the contactor relative to each other and independently of rotation of the motor to control the amount of rotation of the motor for amounts less than the units determined by the circuits through the contacts, and means to automatically effect reversal of the motor in case the motor is rotated beyond said predetermined points.

13. In combination, a motor, means for energizing the motor, and means actuated by the motor and controlling the period during which the motor is operated to effect the stopping of the motor at a plurality of predetermined points, said means comprising a plurality of spaced contacts, a contactor engageable with said spaced contacts, the contacts and the contactor being relatively movable responsive to rotation of the motor, circuits including the contacts and the contactor and operable to control the application of current to the motor, means to optionally select circuits through different ones of said contacts whereby the amount of rotation of the motor is selectively controlled in units equal to that required to effect movement of the contacts and the contactor relative to each other the distance between one contact and an adjacent contact, the last-named means comprising means to pre-select a series of circuits through said contacts to be successively completed whereby the motor is selectively controlled to stop at a plurality of different positions, and means for effecting movement of the contacts and the contactor relative to each other and independently of rotation of the motor to control the amount of rotation of the motor for amounts less than the units determined by the circuits through the contacts.

14. In combination, a motor, means for energizing the motor, and means actuated by the motor and controlling the period during which the motor is operated to effect the stopping of the motor at a plurality of predetermined points, said means comprising a plurality of spaced contacts, a contactor engageable with said spaced contacts, the contacts and the contactor being relatively movable responsive to rotation of the motor, circuits including the contacts and the contactor and operable to control the application of current to the motor, means to optionally select circuits through different ones of said contacts whereby the amount of rotation of the motor is selectively controlled in units equal to that required to effect movement of the contacts and the contactor relative to each other the distance beween one contact and an adjacent contact, and means for effecting movement of the contacts and the contactor relative to each other and independently of rotation of the motor to control the amount of rotation of the motor for amounts less than the units determined by the circuits through the contacts, said last-named means being operable to effect movement of the contacts and the contactor relative to each other in multiples of a predetermined unit of distance.

15. In combination, a motor, means for energizing the motor, and means actuated by the motor and controlling the period during which the motor is operated to effect the stopping of the motor at a plurality of predetermined points, said means comprising a plurality of spaced contacts, a contactor engageable with said spaced contacts, the contacts and the contactor being relatively movable responsive to rotation of the motor, circuits including the contacts and the contactor and operable to control the application of current to the motor, means to optionally select circuits through different ones of said contacts whereby the amount of rotation of the motor is selectively controlled in units equal to that required to effect movement of the contacts and the contactor relative to each other the distance between one contact and an adjacent contact, means to automatically effect a reduction in the speed of the motor as the motor approaches said predetermined points, and means for effecting movement of the contacts and the contactor relative to each other and independently of rotation of the motor to control the amount of rotation of the motor for amounts less than the units determined by the circuits through the contacts.

16. In combination, a motor, means for energizing the motor, means actuated in accordance with rotation of the motor and controlling the period during which the motor is energized to effect the stopping of the motor at a plurality of predetermined points, said means comprising a plurality of spaced contacts, a contactor engageable with said spaced contacts, circuits including the contacts and the contactor and operable to control the application of current to the motor, the circuit associated with each of said contacts being operable to effect the stopping of the motor at one of said predetermined points when its associated contact is in engagement with said contactor, the contacts and the contactor being relatively movable responsive to rotation of the motor, means for effecting movement of the contacts and the contactor relative to each other independently of rotation of the motor, and means determinable by stopping of the motor at one of said predetermined points to select a circuit associated with one of said contacts to determine the next one of the predetermined points at which the motor is to be stopped.

17. In combination, a motor, means for energizing the motor, means actuated in accordance with rotation of the motor and controlling the period during which the motor is energized to effect the stopping of the motor at a plurality of predetermined points, said means comprising a plurality of spaced contacts, a contactor engageable with said spaced contacts, circuits including the contacts and the contactor and operable to control the application of current to the motor, the circuit associated with each of said contacts being operable to effect the stopping of the motor at one of said predetermined points, the contacts and the contactor being relatively movable responsive to rotation of the motor, means for effecting movement of the contacts and the contactor relative to each other independently of rotation of the motor, means determinable by stopping of the motor at one of said predetermined points to select a circuit through one of said contacts to determine the next one of the predetermined points at which the motor is to be stopped, the last-named means comprising a series of contacts and a contactor engageable therewith and movable relative thereto, each of said last named contacts being connected with one of the first named contacts, and means to effect movement of the last named contacts and contactor relative to each other with a step by step motion.

18. In combination, a motor, means for energizing the motor, means actuated in accordance with rotation of the motor and controlling the period during which the motor is energized to effect the stopping of the motor at a plurality of predetermined points, said means comprising a plurality of spaced contacts, a contactor engageable with said spaced contacts, circuits including the contacts and the contactor and operable to control the application of current to the motor, the circuit associated with each of said contacts being operable to effect the stopping of the motor at one of said predetermined points when its associated contact is in engagement with said contactor, the contacts and the contactor being relatively movable responsive to rotation of the motor, and means for effecting movement of the contacts and the contactor relative to each other independertly of rotation of the motor, said last named means being operable on the stopping of the motor and determining the subsequent energization periods of said motor.

19. In combination, a motor, means for energizing the motor, means actuated in accordance with rotation of the motor and controlling the period during which the motor is energized to effect the stopping of the motor at a plurality of predetermined points, said means comprising a plurality of spaced contacts, a contactor engageable with said spaced contacts, circuits including the contacts and the contactor and operable to control the application of current to the motor, the circuit associated with each of said contacts being operable to effect the stopping of the motor at one of said predetermined points when its associated contact is in engagement with said contactor, the contacts and the contactor being relatively movable responsive to rotation of the motor, means for effecting movement of the contacts and the contactor relative to each other and independently of rotation of the motor, and means to effect stopping of the motor with the contactor in a predetermined position relative to the contact in the circuit controlling the application of current to the motor.

20. In combination, a motor, means for energizing the motor, means actuated in accordance with rotation of the motor and controlling the period during which the motor is energized to effect the stopping of the motor at a plurality of predetermined points, said means comprising a plurality of spaced contacts, a contactor engageable with said spaced contacts, circuits including the contacts and the contactor and operable to control the application of current to the motor, the circuit through each of said contacts being operable to effect the stopping of the motor at one of said predetermined points, the contacts and the contactor being relatively movable responsive to rotation of the motor, means for effecting movement of the contacts and the contactor relative to each other and independently of rotation of the motor, means to effect stopping of the motor with the contactor in a predetermined position relative to the contact in the circuit controlling the application of current to the motor, and means to automatically effect a slow down of the motor as the contacts and contactor approach said predetermined position relative to each other.

21. In combination, a motor, means for energizing the motor, means actuated in accordance with rotation of the motor and controlling the period during which the motor is energized to effect the stopping of the motor at a plurality of predetermined points, said means comprising a plurality of spaced contacts, a contactor engageable with said spaced contacts, circuits including the contacts and the contactor and operable to control the application of current to the motor, the circuit associated with each of said contacts being operable to effect the stopping of the motor at one of said predetermined points, the contacts and the contactor being relatively movable responsive to rotation of the motor, means to effect stopping of the motor with the contactor in a predetermined position relative to the contact in the circuit controlling the application of current to the motor, and means for effecting movement of the contacts and the contactor relative to each other independently of rotation of the motor, said last-named means being automatically operable on the stopping of the motor.

22. In combination, a motor, means for energizing the motor, means actuated in accordance with rotation of the motor and controlling the direction of rotation and the period during which the motor is operated to effect the stopping of the motor at a plurality of predetermined points, said means comprising a plurality of spaced contacts, a contactor engageable with said spaced contacts, circuits including the contacts and the contactor and operable to control the application of current to the motor, the circuit associated with each of said contacts being operable to effect stopping of the motor at one of said predetermined points when its associated contact is in engagement with said contactor, means to optionally select a circuit through one of said contacts to determine the point at which the motor is next to be stopped determinable upon stopping of said motor, means controlled by the circuit through the selected contact to effect energization of the motor to cause the motor to rotate in a direction to move the contactor towards the selected contact, and means for effecting movement of the contacts and the contactor relative to each other independently of rotation of the motor.

23. In combination, a motor, means for energizing the motor, and means actuated by the motor and controlling the period during which the motor is energized, said means comprising a relay controlling the circuit to the motor, the relay having a winding and being operable responsive to the flow of current in the winding, a resistance, circuit connections for the resistance to establish a flow of current through the resistance, each end of the relay winding being connected to a different point on said resistance whereby a flow of current through the winding is established, the flow of current through the relay winding being interrupted when the ends of the winding are connected to substantially the same point on the resistance, means operable responsive to rotation of the motor to move the connection of one end of the winding with the resistance to the point of connection of the other end of the winding with the resistance, whereby the circuit to the motor is interrupted after a predetermined amount of rotation of the motor, and means for moving the point of connection of the first-named end of the relay with the resistance independently of rotation of the motor.

24. Apparatus for stopping a motor driven load in a plurality of predetermined positions, comprising: stationary electrical contact means; movable electrical contact means adapted to be driven by the motor to stop said motor when said movable contact means and said stationary contact means are in a certain relative position with respect to each other; and means operable when said motor is stopped for moving said movable contact means away from said certain relative position a predetermined distance corresponding to the distance said motor is to move said load on the next application of power to said motor.

25. Apparatus for controlling the operation of an electric motor adapted to move a load, comprising: control means movable to a plurality of selected positions, each selected position controlling a predetermined stopping position of the load; a selector device for preselecting said selected positions; and electro-responsive means actuated upon the deenergization of said motor for operating said selector device to preselect the next selected position of said control means.

26. Apparatus for controlling the operation of an electric motor comprising a plurality of circuits for controlling said motor, circuit control means having a standstill position of engagement representing a standstill condition of said motor, said circuit control means including a relatively movable contactor, means controlled by the position of said contactor for causing opening of one of said circuits, circuit controlling means for closing another of said circuits to prepare for stoppage of said motor and operable upon opening of said first mentioned circuit, said circuit controlling means being operable at a predetermined distance from said standstill position of engagement of said circuit control means to open said closed circuit and stop said motor at said standstill condition, and slow-down means operable prior to opening of said last mentioned circuit for decreasing the speed of said motor.

27. In a motor controlling mechanism, the combination of a motor, a rheostat having an arm operatively associated with said motor, a relay responsive to movement of said arm for controlling said motor, means for moving said arm independently of said motor, and means selecting variable connections between said relay and rheostat determinable by the deenegization of said motor.

28. The combination of a motor, a rheostat device having a plurality of stationary contacts and a relatively movable contacting arm, said arm being movable in accordance with rotation of the motor, a polarized relay for controlling the application of current to said motor, a coil for operating said relay having a pair of terminals, one of said terminals being connected to said arm, a selector device for providing a plurality of connections between the other of said terminals and said rheostat contacts, and means for actuating said selective device rendered operative consequent upon deenergization of said motor.

29. Apparatus for controlling the operation of an electric motor, comprising an energizing circuit for said motor, switching means for operatively connecting and disconnecting said motor to said energizing circuit, controlling means including a contactor and contacts, said contactor being movable by said motor into engagement with said contacts and being movable independently of said motor, said contactor and contacts having a standstill position of engagement representing a standstill condition of said motor, circuit controlling means for operating said switching means and operable when said contactor is at a predetermined distance from said standstill position of engagement to disconnect said motor from said energizing circuit and stop said motor at said standstill condition, and means to move said contact independently of said motor away from said standstill position of engagement to govern amount of subsequent rotation of said motor.

30. An apparatus for controlling the operation of an electric motor, comprising a plurality of power circuits for carrying current to said motor, a plurality of control circuits for controlling said motor, a control contact and a relatively movable contact cooperable therewith, means controlled by the relative position of said control contact and said movable contact, for causing opening of one of said control circuits, circuit controlling means for closing another of said circuits to prepare for stoppage of said motor, means, operable upon opening of said last closed control circuit, for opening one of said power circuits to deenergize said motor, and slow-down means operable prior to opening of said power circuit, for decreasing the speed of said motor.

31. An apparatus for controlling the operation of an electric motor, comprising a plurality of power circuits for carrying current to said motor, switching means for connecting and disconnecting each of said power circuits to the motor, control contact means having a standstill position of engagement representing a standstill condition of said motor, said means including a stationary contact and a contactor movable by said motor engageable with said stationary contact for controlling a circuit controlling means, said circuit controlling means being operated by said motor to operate the switching means for interrupting certain of said power circuits when said contactor is in a predetermined position of engagement with said contacts, and slow-down means operated by said circuit controlling means for decreasing the speed of said motor prior to said interruption of said power circuit, whereby said motor is at said standstill condition when said control contact means is at said standstill position of engagement.

32. An apparatus for controlling the operation of an electric motor, comprising a plurality of power circuits for carrying current to said motor, a plurality of control circuits for controlling said motor, control contact means having a standstill position of engagement representing a standstill condition of said motor, said means including a stationary contact and a relatively movable contact cooperable therewith; means, controlled by the relative position of said stationary contact and said movable contact, for causing opening of one of said control circuits and closure of another of said control circuits to prepare for slowing said motor; circuit controlling means for closing another of said control circuits to prepare for stoppage of said motor and operable when said movable contact has attained a predetermined position of engagement with said stationary contact to reopen said last closed control circuit; means operable upon reopening of said last closed control circuit, for opening one of said power circuits to deenergize said motor; slow-down means, operable prior to opening of said power circuit, for decreasing the speed of said motor, whereby said motor is nearly at standstill condition when said standstill position of engagement is attained; and means for effecting reversal of said motor to said standstill condition in case said motor overruns its standstill condition.

33. An apparatus for controlling the operation of an electric motor comprising an energizing circuit for said motor; controlling means including a contactor and a plurality of contacts; said contactor being movable by said motor into engagement with said contacts and being movable independently of said motor; said contactor and contacts having a standstill position of engagement representing a standstill condition of said motor, and circuit controlling means for said energizing circuit including means operable when said contactor is at a predetermined distance from said standstill position of engagement to interrupt a flow of current to said motor and stop said motor at said standstill condition; means for selecting at will any other of said control contact means to effect different standstill conditions of said motor, and means for moving said contactor independently of said motor a predetermined distance from said selected contact to govern the amount of subsequent rotation of said motor.

34. A screw-down motor control system for shifting the rolls of rolling mills into different adjusted positions with respect to each other and including a screw-down motor for shifting the rolls and arranged for connection to a source of electrical energy, a single control means for controlling the operation of the motor for roll shifting, scheduling means settable for predetermining concurrently a plurality of independent schedules of roll shifting by the screw-down motor, each schedule defining a plurality of adjusted roll positions in a predetermined sequence, and means for operatively associating the scheduling means with the same control means selectively with respect to said schedules for controlling the motor operations to effect the roll shifting in accordance with any selected one of the schedules and for concurrently rendering the motor irresponsive to the other schedules.

35. Apparatus for controlling the operation of an electric motor comprising a plurality of circuits for controlling said motor, circuit control means having standstill positions of engagement representing standstill conditions of said motor, respectively, said circuit control means including a contactor movable by said motor and movable independently of said motor, the positions of said contactor determining the standstill positions of engagement of said circuit control means, respectively, means controlled by the position of said contactor for causing opening of one of said circuits, circuit controlling means rendered operative by opening of said first mentioned circuit to close another of said circuits to prepare for stoppage of said motor, said circuit controlling means being operable at a predetermined distance from said standstill positions of engagement of said circuit control means to open said closed circuit and stop said motor at one of said standstill conditions, and means to move said contactor independently of said motor away from any one of its said positions determining one of said standstill positions of engagement of said circuit control means for governing a subsequent amount of rotation of said motor to another standstill condition.

36. Apparatus for controlling the operation of an electric motor comprising a plurality of circuits for controlling said motor, circuit control means having standstill positions of engagement representing standstill conditions of said motor, respectively, said circuit control means including a contactor movable by said motor and movable independently of said motor, the positions of said contactor determining the standstill positions of engagement of said circuit control means, respectively, means controlled by the position of said contactor for causing opening of one of said circuits, circuit controlling means rendered operative by opening of said first mentioned circuit to close another of said circuits to prepare for stoppage of said motor, said circuit controlling means being operable at a predetermined distance from said standstill positions of engagement of said circuit control means to open said closed circuit and stop said motor and one of said standstill conditions, means for automatically effecting reversal of said motor to said last mentioned standstill condition when said motor overruns said last mentioned standstill condition, and means to move said contactor independently of said motor away from any one of its said positions determining one of said standstill positions of engagement of said circuit control means for governing a subsequent amount of rotation of said motor to another standstill condition.

DAVID C. WRIGHT.
HARRY L. WILCOX.